United States Patent
Pujari et al.

(10) Patent No.: US 9,792,057 B1
(45) Date of Patent: Oct. 17, 2017

(54) DATA CACHING SYSTEM AND METHOD FOR HYPERVISOR-BASED COMPUTER SYSTEMS

(71) Applicant: CacheBox Inc., San Carlos, CA (US)

(72) Inventors: Harish Chandra Pujari, Pune (IN);
Anand Mitra, Pune (IN); Dilip Madhusudan Ranade, Pune (IN);
Prasad Gajanan Joshi, Pune (IN)

(73) Assignee: PrimaryIO, Inc., San Carlos, CA (US)

( * ) Notice: Subject to any disclaimer, the term of this patent is extended or adjusted under 35 U.S.C. 154(b) by 59 days.

(21) Appl. No.: 14/863,447

(22) Filed: Sep. 23, 2015

Related U.S. Application Data

(60) Provisional application No. 62/053,942, filed on Sep. 23, 2014.

(51) Int. Cl.
*G06F 12/00* (2006.01)
*G06F 13/00* (2006.01)
(Continued)

(52) U.S. Cl.
CPC .......... *G06F 3/0619* (2013.01); *G06F 3/0665* (2013.01); *G06F 3/0685* (2013.01); *G06F 12/0806* (2013.01); *G06F 2212/621* (2013.01)

(58) Field of Classification Search
CPC .......... G06F 3/06; G06F 3/061; G06F 3/0611; G06F 3/0613; G06F 3/0614; G06F 3/0616; G06F 3/0617; G06F 3/0619; G06F 3/0664; G06F 3/0662; G06F 3/0665; G06F 3/0667; G06F 3/0683; G06F 3/0685; G06F 3/0688; G06F 6/0689; G06F 12/0246; G06F 12/08; G06F 12/0802; G06F 12/0804;
(Continued)

(56) References Cited

U.S. PATENT DOCUMENTS

| | | | |
|---|---|---|---|
| 8,751,828 B1 * | 6/2014 | Raizen | H04L 9/08 380/278 |
| 8,954,575 B2 * | 2/2015 | Raja | G06F 3/0635 709/214 |

(Continued)

OTHER PUBLICATIONS

Virt Cache: Managing Virtual Disk Performance Variation in Distributed File Systems for the Cloud; Arumugan et al; IEEE 6th International Conference on Cloud Computing Technology and Science; Dec. 15-18, 2014; pp. 210-217 (8 pages).*

(Continued)

*Primary Examiner* — Daniel C Chappell

(57) ABSTRACT

An embodiment of the invention provides an apparatus comprising: a hypervisor comprising a virtual caching appliance (VCA) and an intermediate multipathing module that interfaces with VCA; wherein the intermediate multipathing module is configured to pass an I/O request from a virtual machine to the VCA; and wherein the VCA is configured to determine if the I/O request is to be passed from the VCA to a solid state storage or if the I/O request is to be passed from the VCA to a hard disk storage. Another embodiment of the invention provides a method comprising: passing an I/O request from a virtual machine to a virtual caching appliance (VCA) in a hypervisor; and determining if the I/O request is to be passed from the VCA to a solid state storage or if the I/O request is to be passed from the VCA to a hard disk storage.

20 Claims, 4 Drawing Sheets

(51) Int. Cl.
*G06F 13/28* (2006.01)
*G06F 3/06* (2006.01)
*G06F 12/0806* (2016.01)

(58) Field of Classification Search
CPC .............. G06F 12/0806; G06F 12/0808; G06F 12/0811; G06F 12/0813; G06F 12/12; G06F 13/105; G06F 17/30; G06F 17/30067; G06F 2212/62; G06F 2212/621; G06F 2212/72; G06F 2212/7201; G06F 2212/7202; G06F 2212/7203; G06F 2212/7204; G06F 2212/7205; G06F 2212/7206; G06F 2212/7207; G06F 2212/7208; G06F 2212/7209; G06F 2212/7211
See application file for complete search history.

(56) References Cited

U.S. PATENT DOCUMENTS

| | | | | |
|---|---|---|---|---|
| 9,477,508 | B1* | 10/2016 | Vemuri | G06F 9/45558 |
| 2013/0111474 | A1* | 5/2013 | Agarwal | G06F 9/45558 |
| | | | | 718/1 |
| 2013/0166724 | A1* | 6/2013 | Bairavasundaram | G06F 9/5016 |
| | | | | 709/224 |
| 2014/0173113 | A1* | 6/2014 | Vemuri | H04L 41/5022 |
| | | | | 709/226 |
| 2015/0020068 | A1* | 1/2015 | Garza | G06F 9/45533 |
| | | | | 718/1 |
| 2015/0040128 | A1* | 2/2015 | Garza | G06F 9/45558 |
| | | | | 718/1 |
| 2015/0046589 | A1* | 2/2015 | Garza | G06F 9/5077 |
| | | | | 709/226 |

OTHER PUBLICATIONS

Exploiting Neigborhood Similarity for Virtual Machine Migration over Wide-Area Network; Lai et al; IEEE 7th International Conference on Software Security and Reliability; Jun. 18-20, 2013; pp. 149-158 (10 pages).*

Responding rapidly to service level violations using virtual appliances; Bairavasundaram et al; ACM SIGOPS Operating Systems Review, vol. 46, iss. 3; Dec. 2012; pp. 32-40 (9 pages).*

* cited by examiner

Hypervisor Configuration

VM Migration in a Cluster of Hypervisors

DATA CACHING SYSTEM AND METHOD FOR HYPERVISOR-BASED COMPUTER SYSTEMS

CROSS-REFERENCE(S) TO RELATED APPLICATIONS

This application claims the benefit of and priority to U.S. Provisional Application 62/053,942, filed 23 Sep. 2014. This U.S. Provisional Application 62/053,942 is hereby fully incorporated herein by reference.

FIELD

Embodiments of the invention relate generally to data storage systems.

DESCRIPTION OF RELATED ART

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against this present disclosure.

Various caching solutions are available for data storage systems. Typically, these caching solutions lack efficiency in a very complex and/or high volume data storage environment. Additionally, there is a continuing need for conventional systems to achieved improved performance.

While the above-noted systems are suited for their intended purpose(s), there is a continuing need for reliable data storage systems.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
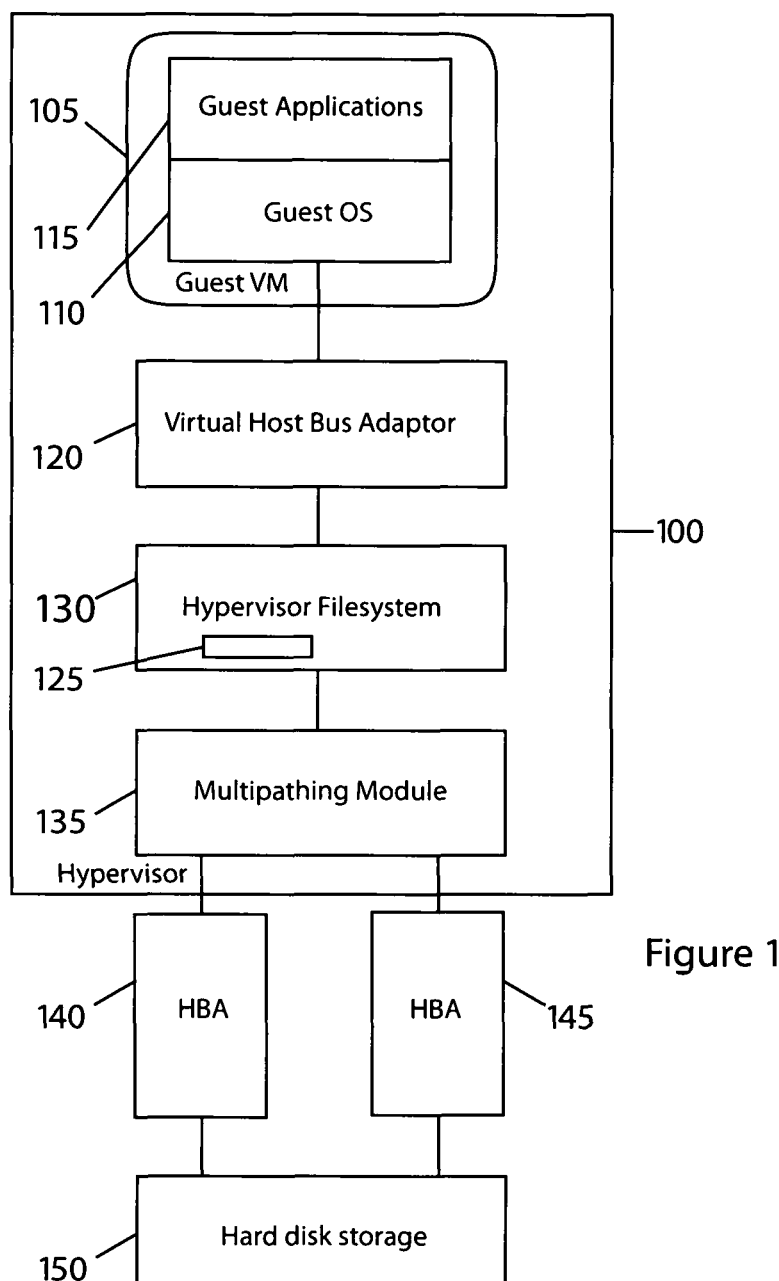
FIG. 1 is a block diagram of a hypervisor configuration.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

In an embodiment of the invention, a system and method provide high performance SSD (solid state disk) data caching with minor disruptions to existing hypervisor configurations.

Glossary

The following definitions are provided herein and are not necessarily limiting in one or more embodiments of the invention.

Dynamic Multipathing: In computer data storage technology field, dynamic multipathing (DMP) is a multipath I/O (also referred herein as "IO") enhancement technique that balances input/output (I/O) across many available paths from the computer to the storage device to improve performance and availability. The name was introduced with the Veritas Volume Manager software.

HBA: In computer hardware, a host controller, host adapter, or host bus adapter (HBA) connects a host system (a computer or another physical machine) to other network and storage devices. The terms are primarily used to refer to devices for connecting SCSI, Fibre Channel and eSATA devices.

Hypervisor: A hypervisor or virtual machine monitor (VMM) is a piece of computer software, firmware, or hardware that creates and runs virtual machines. A computer (or other physical machine) on which a hypervisor is running one or more virtual machines is defined as a host machine. Each virtual machine is called a guest machine (or guest Virtual Machine).

Solid state disk (SSD): SSDs have no moving mechanical components. This distinguishes SSDs from traditional electromechanical magnetic disks such as hard disk drives (HDDs) or floppy disks, which contain spinning disks and movable read/write heads.

Flash Storage: Flash memory is an electronic non-volatile computer storage medium that can be electrically erased and reprogrammed. Introduced by Toshiba in 1984, flash memory was developed from EEPROM (electrically erasable programmable read-only memory).

Virtual Machine (VM): See hypervisor above.

Virtual Hard disk (VHD): an individual file in the hypervisor file system is offered to a guest Virtual Machine (computer virtual machine) as a virtual hard disk (VHD).

Computer virtual machines (Guest VMs) are run in a special-purpose operating system called hypervisor. VMware hypervisor, Microsoft hypervisor, Linux KVM are some examples of hypervisors.

Typically, the hypervisor consolidates available hard disk storage and allocates portions of the available hard disk storage to Guest VMs in the form of virtual disks. The raw storage may be managed through a file system; an individual file in the hypervisor file system is offered to a guest VM as a virtual hard disk (VHD). An alternative configuration supports "raw disks" where the hypervisor file system is not involved in the IO flow. Clearly this variation (alternative configuration) is also covered by one or more embodiments of the invention described below.

Hard disk storage is generally poor at random IO loads in current systems.

Multipathing. Further, the hypervisor storage modules incorporate Dynamic Multipathing components for high availability: when there are multiple IO paths to the storage, a multipathing component directs IO from VM to storage down (along) one or more of the currently available IO paths. These components may be developed by the hypervisor vendor or by third party.

Clusters. Instances of hypervisors may be run on multiple physical servers interconnected in a cluster. The storage is "shared"; i.e. accessible through multiple servers of the cluster. The hypervisor manages distributed access to the shared storage using appropriate distributed locking protocols. When a file system manages the shared storage, the file system itself may manage distributed access.

SSDs. These hypervisor servers may also be installed with SSDs or flash storage (these terms are interchangeable for this invention; we will use SSD to mean either term in the discussion herein): SSDs may be used as a high performance substitute for hard disk storage, but their higher cost often prohibits this type of use. A more cost-efficient method is to use SSDs as a data cache for better IO performance.

Problem Statement

The following are example issue(s) that are addressed by one or more embodiments of the invention.

Multiple guest VMs run in a hypervisor, they independently issue IO, through their respective virtual disks, ultimately to the underlying storage. This mix of independent IO streams presents a very random IO load to the underlying storage leading to IO performance bottlenecks. Using SSD as a data cache for this IO dramatically speeds up performance.

However, some important hypervisor operating systems are so architected that it is not possible to insert a third party hypervisor caching module in the IO path between the guest VM and the hypervisor virtual hard disk, although it is possible to insert third party multipathing modules lower in the IO stack.

Known Solutions

Some solutions are already known or are in use, but each has certain drawbacks as at least summarized below.

1. A caching module can be inserted within the guest VM. It is difficult to build and administer modules that must work on many different OS and OS versions used in guest VMs.

2. A caching module can be run as an independent VM appliance that appears as virtual storage. It is problematic to connect each guest VM to the VM appliance. There are also problems with performance.

3. A caching module can be inserted as multipathing module lower in the IO stack. It is difficult to provide selective caching, support guest VM migration, and this approach also involves high support costs (when functionality of third party IO modules needs to be subsumed by new module).

Example Target Product

In an embodiment of the invention, the example target is a software product comprising of a set of components that adhere to the constraints imposed by hypervisor architecture and yet improve IO performance by using SSDs for data caching.

A hypervisor configuration 100 without the invention is given in schematic of FIG. 1. This is explained first, followed by a description of embodiments of the invention in subsequent figures.

Moving top down in FIG. 1, the following are discussed: The guest VM 105 comprises a guest virtual machine operating system 110 (guest VM OS 110) and one or more guest applications 115. The Guest VM OS 110 mounts, through a virtual Host Bus Adaptor (HBA) 120, a virtual hard disk (VHD) 125 created by the hypervisor filesystem 130. Storage for the VHD 125 is provided, via the multipathing module 135 and multiple host bus adapters (HBAs) 140 and 145, by hard disk storage 150 depicted at the bottom of FIG. 1.

The functions of the guest virtual machine 105 were similarly discussed above. A guest virtual machine includes one or more guest application and a guest operating system (OS).

The functions of the HBAs, Hard disk storage, and multipathing modules were similarly discussed above.

The functions of the Hypervisor were similarly discussed above. The Hypervisor 100 includes a virtual host bus adapter 120, hypervisor filesystem 130, and multipathing module 135.

Figure 2:
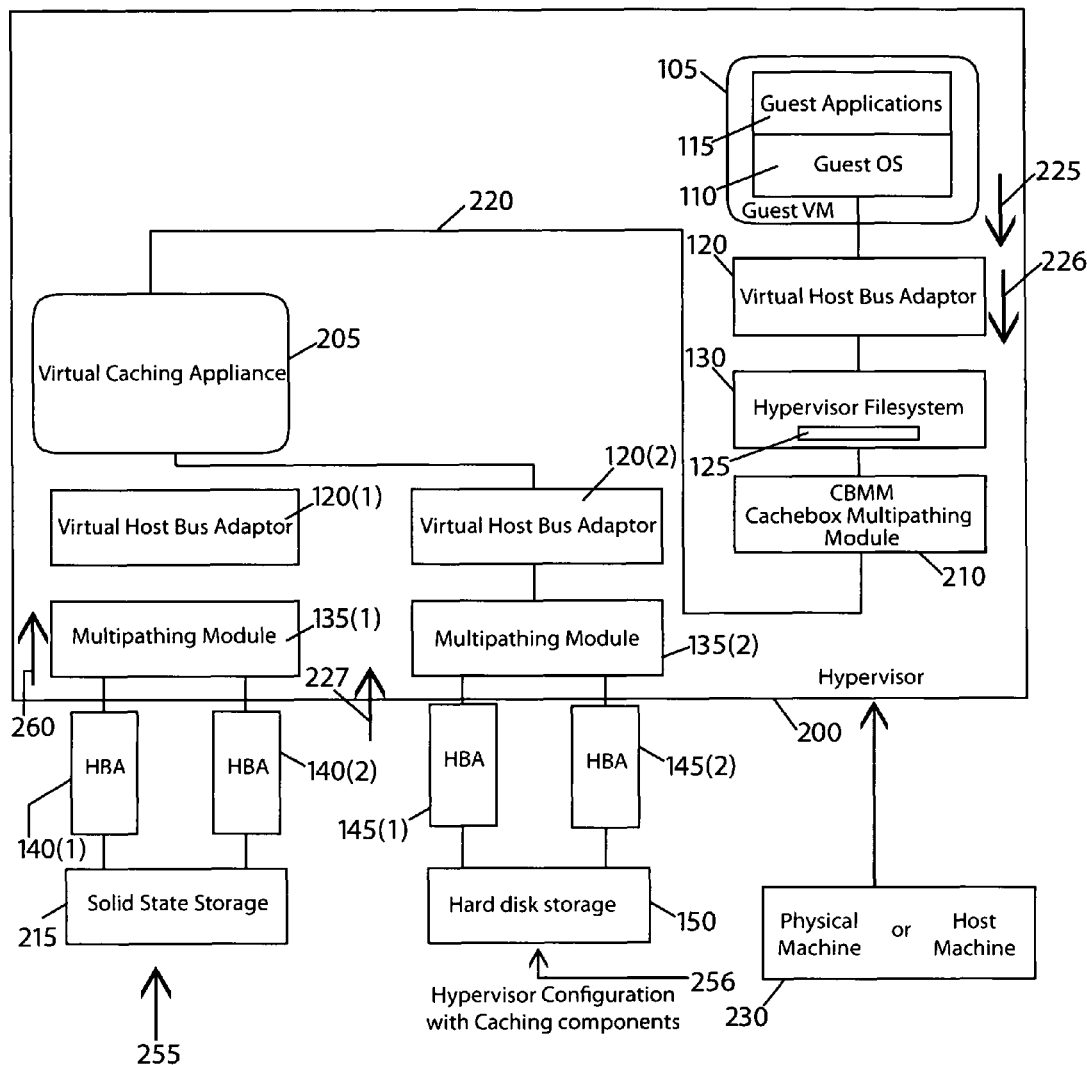
FIG. 2 is a block diagram of a system in accordance with an embodiment of the invention.

Now referring to FIG. 2, where the new components that comprise an embodiment of the invention are shown in the blocks comprising the Virtual Caching Appliance 205 and multipathing module (CBMM) 210 (e.g., Cachebox Multipathing Module) and the high speed connection 220 that connects the Virtual Caching Appliance 205 and CBMM 210. Therefore, FIG. 2 illustrates a hypervisor 200 in accordance with an embodiment of the invention.

In an embodiment of the invention, the CBMM 210 is more generally denoted as an "intermediate multipathing module 210" CBMM 210 or "special purpose multipathing module" CBMM 210. Additional IO stack for SSDs is present at lower left of FIG. 2 (SSD, HBAs, multipathing module, virtual HBA).

An embodiment of the invention works or functions as follows. The above-mentioned modules VCA 205 and CBMM 210 (intermediate multipathing module 210) are the main components of the invention. The modules VCA 205 and CBMM 210 are typically software modules. Other product components such as administration or management modules are not described further and would be understood by those skilled in the art based on the disclosure provided herein or are components understood by those skilled in the art. Additionally, other components that are included in (or may be included in) FIG. 2 (e.g., solid state storage, flash storage, hard disk storage, HBAs, Hypervisor, multipathing modules, Host Bus Adapters, Hypervisor Filesystem, Virtual Host Bus Adapter, Guest VM, Guest OS, and Guest Applications) are similarly described above.

Both the original storage (e.g., Hard disk storage 150) as well as SSD storage 215 is claimed by the Virtual Caching Appliance (VCA) 205 on the top left of FIG. 2. In turn, the VCA 205 exports one or more virtual devices that are exclusively claimed by the Multipathing module CBMM 210 on the bottom right of FIG. 2. The VCA 205 and CBMM 210 are connected by the communication path 220 that is shown by broken line between the VCA 205 and CBMM 210. This communication path 220 may employ one or more standard or proprietary protocols, such as SCSI, ISA, FC, or shared memory based data transport.

When the hypervisor 200 configuration shown in FIG. 2 starts up, the hypervisor filesystem 130 detects and mounts the device made visible through CBMM 210. No file system layout needs to be changed for this start-up of the hypervisor configuration. Now, when the Guest VM 105 (at the top right of FIG. 2) issues IOs 225 (IO requests 225), the VCA 205 is interposed in the IO path and will perform all functions of data caching such as read-only, write-through, and write-back caching.

In the virtual environment, one or more guest VMs 105 may run on the hypervisor 200. A physical machine (e.g., a computer) on which a hypervisor 200 is running one or more virtual machines is defined as a host machine. The host machine is represented as block 230 (or host machine 230) in FIG. 2. Each virtual machine 105 is called a guest machine 105 (or guest VM 105) as shown in FIG. 2. A virtual machine 105 has a view of its own virtual hard disk 125.

Each multipathing module (e.g., multipathing modules 135(1) and 135(2)) in FIG. 2 was similarly described above and has intelligence to determine which cables to the HBAs (e.g., HBAs 140(1), 140(2), 145(1), and 145(2)) are active or operational and which cables have failed, if any. Each multipathing module 135(1) and 135(2) can also multiplex a transmitted signal through the cables and/or HBAs in order to increase data throughput from the hypervisor 200 to the target storage device (e.g., solid state storage 215) and from a target storage device (e.g., solid state storage 215 or hard disk storage 150) to the hypervisor 200.

As an example operation of the virtual system 250 of FIG. 2, a guest OS 110 (in the guest VM 105) will transmit an I/O request 225 from a guest application 115 (in the guest VM 105). The guest VM 105 may have one or more guest applications 115. The hypervisor 200 can create and run one or more guest VMs 105. An I/O request 225 can be, for example, a write request or a read request.

The Virtual Host Bus Adapter (VHBA) 120 will process the I/O request 225 from the guest OS 110 and will transmit the I/O request 225 to the Hypervisor Filesystem 130.

The Hypervisor Filesystem 130 will process the I/O request 225 and will transmit the I/O request 225 to the multipathing module CBMM 210. The Hypervisor Filesystem 130 will translate the I/O request 225 to a file in the Hypervisor Filesystem 130, and will map this file to a particular logic offset which is a block address in a physical storage device (e.g., solid state storage 215).

File systems are also discussed in, for example, the following: File System—Wikipedia.

Further, an embodiment of the invention is equally applicable to configurations called "raw virtual hard disk" wherein the hypervisor filesystem is not included in the IO path (of a request 225) from VM to physical hard disk storage.

There may be more than one guest VMs 105 running on the hypervisor 200 and more than one I/O request 225 being transmitted by guest VMs 105 to the Hypervisor Filesystem 130 and multipathing module CBMM 210.

Since the hypervisor 200 is in the same physical machine 230, the data interconnect 220 between the module CBMM 210 and module VCA 205 is a fast low-overhead functionality. As an example, if the IO request 225 is a write I/O request, write data 226 may be in one or more pages, depending on the size of the data in the write request. The guest VM 105 will map the pages having the write data 226 to the address space of the guest virtual machine. The module CBMM 210 will then map these pages into the address space of the module VCA 205 so that these pages become immediately visible to the module VCA 205. The module CBMM 210 will map these pages into the address space of the module VCA 205 by modifying entries in a table that maps the pages. Since these pages having the write data are not copied from the module CBMM 210 to the module VCA 205, this type of operation is a zero-page copy.

If the IO request 225 is a read IO request for a read operation, the pages having the read data 227 from the solid state storage 215 or hard disk storage 150 will be mapped to the address space of the module VCA 205 after a read operation is performed by the module VCA 205. The module VCA 205 will then map the pages having the read data 227 to the address space of the module CBMM 210 so that these pages become immediately visible to the module CBMM 210. The module CBMM 210 will then pass the read data 227 to the Hypervisor Filesystem 130 and then the read data 227 is transmitted via the Virtual Host Bus Adapter 120 and then to the guest VM 105 and to the requesting guest application 115.

The module VCA 205 caches (copies) data blocks from hard disk storage 150 to solid state storage 215 based on one or more rules, or on commands issued by an external module that may reside in hypervisor 200, VM 105, or even external to the server 230 (or host machine 230). Caching is performed as a part of servicing VM-issued IO requests or it may be performed independently.

Caching comprises of storing data block exclusively in cache ("write-back cache") or storing data block in both cache and hard disk storage ("write-through" or "read-only" cache). Additional metadata that maps data block location on hard disk to the location of the corresponding cached data block in the cache is also stored in the system 250, typically in the SSD 215 itself. Metadata may also contain more data such as various IO statistics, caching policies.

For a write application, the module VCA 205 will transmit the write acknowledgement signal 260 from the target storage device to the module VCA 205 and along the high communication path 220 to the module CBMM 210. The write acknowledgement signal 260 is then transmitted via the Hypervisor Filesystem 130 and Virtual Host Bus Adapter 120 and to the Guest VM 105 and guest application 115 that issued the write I/O request.

The multipathing module CBMM 210 will then pass the I/O request 225 to the VCA 205 by making the I/O request 225 to be visible to the VCA, as will be discussed further below in additional details.

The VCA 205 has logic or intelligence to determine: (1) if the VCA 205 will pass the I/O request 225 via a first Virtual Host Bus Adapter 120(1) and first multipathing module 135(1) and through the first set of HBAs 140(1) and 140(2) and to the solid state storage 215 (left side path 255, or first path 255, between the Hypervisor 200 and solid state storage 215); or (2) if the VCA 205 will pass the I/O request 225 via a second Virtual Host Bus Adapter 120(2) and second multipathing module 135(2) and through the second set of HBAs 145(1) and 145(2) and hard disk storage 150 (right side path 256, or second path 256, between the Hypervisor 200 and hard disk storage 150). In one embodiment, the VCA 205 will look up tables, depending on whether the I/O request 225 is a read or write request, to determine the write policy and will transmit the I/O request 225 via the Virtual Host Bus Adaptor 120(1) and Multipathing Module 135(1) to the HBAs 140(1) and 140(2) and solid state storage 215 for a write request 225.

For a read request 225, the module VCA 205 will look up tables to determine if the read data blocks are available on the solid state storage 215 and will read (via the left side path 255) the read data blocks if available in the solid state storage 215. If the read data blocks are not available in the solid state storage 215, the module VCA 205 will read (via the right side path 256) the read data blocks from the hard disk storage 150. The read data 227 is transmitted via the HBAs 145(1) or 145(2) from the HDD 150 and via multipathing module 135(2) and virtual host bus adaptor 120(2), or the read data 227 is transmitted via HBAs 140(1) and 140(2) from SSD 215 if the read data is available from the SSD 215 and via multipathing module 135(1) and virtual host bus adaptor 120(1). The read data 227 then transmitted by VCA 205 to the module CBMM 210, Hypervisor Filesystem 130, Virtual Host Bus Adapter 120, and guest VM 105, and to the requesting guest application 115.

Therefore, in an embodiment of the invention, the system 250 (apparatus 250) comprises: a hypervisor 200 comprising a virtual caching appliance (VCA) 205 and an intermediate multipathing module 210 that interfaces with VCA 205; wherein the intermediate multipathing module 210 is configured to pass an I/O request 225 from a virtual machine 105 to the VCA 205; and wherein the VCA 205 is configured to determine if the I/O request 225 is to be passed from the VCA 205 to a solid state storage 215 or if the I/O request is to be passed from the VCA 205 to a hard disk storage 150.

In another embodiment of the invention, the VCA 205 is configured to perform data caching of a hard disk storage 150 on a solid state storage 215; wherein the intermediate multipathing module 210 is configured to intercept virtual disk IO (input/output) requests 225 from a virtual machine 105 and to propagate the IO requests to the VCA 205; and wherein the intermediate multipathing module 210 is configured to propagate data 227 returned from the VCA 205 back to the virtual machine 105.

Another embodiment of the invention provides a method comprising: passing an I/O request 225 from a virtual machine 105 to a virtual caching appliance (VCA) 205 in a hypervisor 200; and determining if the I/O request 225 is to be passed from the VCA 205 to a solid state storage 215 or if the I/O request 225 is to be passed from the VCA 205 to a hard disk storage 150.

Another embodiment of the invention provides an article of manufacture, comprising: a non-transient computer-readable medium having stored thereon instructions that are configured to: pass an I/O request 225 from a virtual machine 105 to a virtual caching appliance (VCA) 205 in a hypervisor 200; and determine if the I/O request 225 is to be passed from the VCA 205 to a solid state storage 215 or if the I/O request 225 is to be passed from the VCA 205 to a hard disk storage 150.

An embodiment of the invention provides the system 250 configuration in FIG. 2 wherein the above-described functionalities and advantages of the multipathing module are maintained and left intact. In contrast, in current systems, caching solutions replace the multipathing module so that current systems are not able to advantageously provide increased data throughput and/or determine active or operational data paths and failed data paths.

Enhancements to an embodiment(s) of the invention are now discussed.

In addition to the basic method described above with reference to FIG. 2, in one embodiment, an embodiment of the invention may be enhanced to support a cluster of hypervisor servers. The Hypervisor 200 Configuration of FIG. 2 is replicated on each server of the cluster in this other embodiment of the invention.

Figure 3:
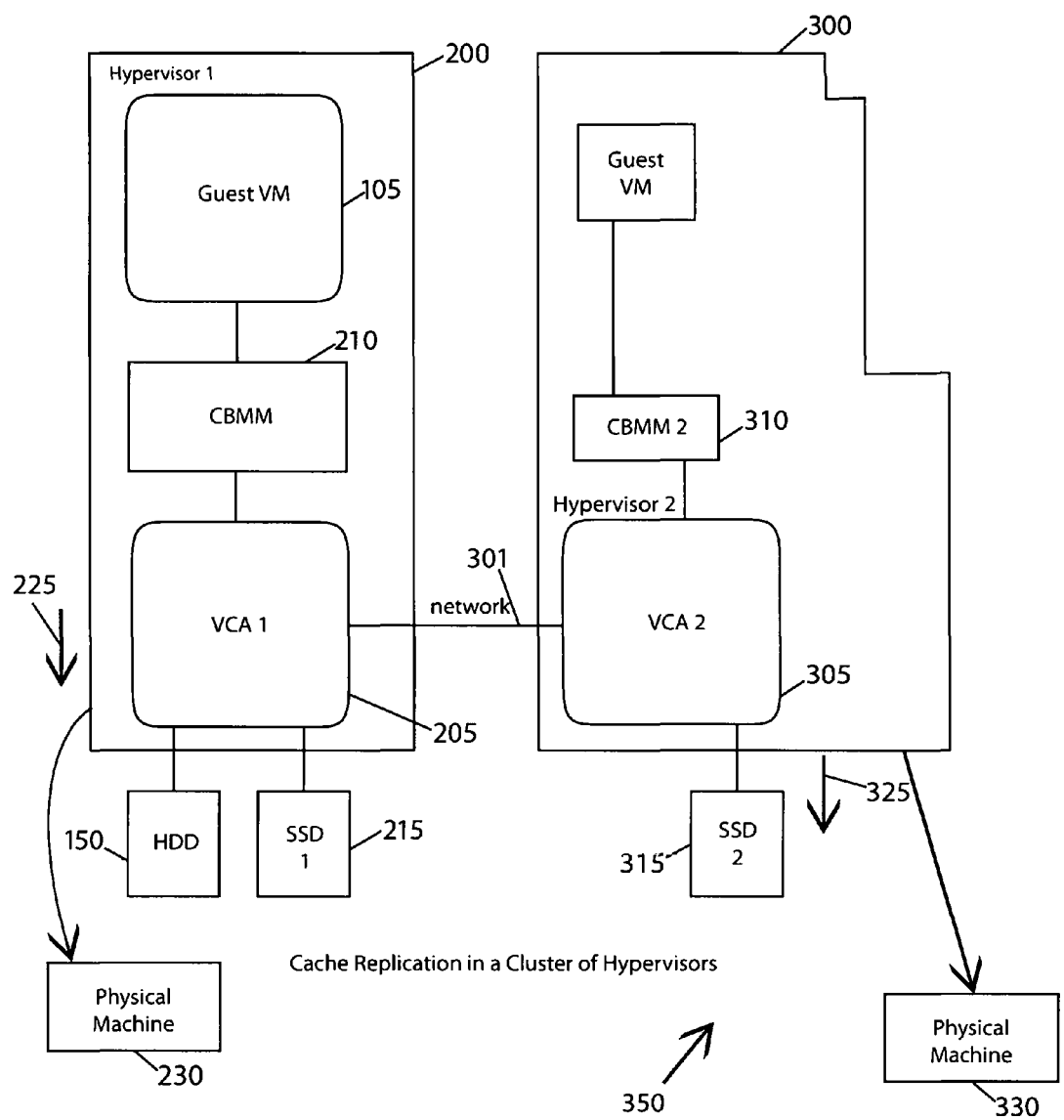
FIG. 3 is a block diagram of a system in accordance with another embodiment of the invention.

FIG. 3 is a simplified schematic that shows VCA1 (first VCA instance 205) and VCA2 (second VCA instance 305) communicating over a network connection 301 to provide cache replication. The network connection 301 provides a communication path between VCA1 and VCA2. Data cached in SSD1 (first solid state storage device 215) is replicated to SSD2 (second solid state storage device 315) via VCA1 (Virtual Caching Appliance 1). The VCA1 passes IO requests 225 to the HDD 150 and SSD 215 as similarly discussed above. The VCA2 passes IO requests 325 to the SSD 315. In the system 350 shown in FIG. 3, the hypervisor 1 (first hypervisor 200) is running on a first physical machine 230 (or first computer 230), while the hypervisor 2 (second hypervisor 300) is running on a second physical machine 330 (or second computer 330). The VCA module 205 is enhanced to a distributed variant through a network interconnect 301 set up between two or a plurality of VCA instances (VCA1 and VCA2). This set of interconnected VCA instances VCA1 and VCA2 works to support guest VM behaviour in a cluster hypervisor configuration that is provided by the system 350. For example, a guest VM 105 (in hypervisor 200) can be shut down and started on a second hypervisor server (physical machine 330 which is running second hypervisor 300) while the caching data service continues to be offered without interruption by the second VCA instance (VCA2) on the second server 330. An additional enhancement is the ability to replicate the cached data on other hypervisor servers for better support of guest VM migration, failover, and high-availability. The network interconnect 301 could be implemented on a variety of technologies, for example, Ethernet, Fiber Channel, Infiniband, direct serial links, etc.

In FIG. 3, the Hypervisor 1 (first hypervisor 200) can access and is coupled to the HDD 150 and SSD1 (first SSD 215), while the Hypervisor 2 (second hypervisor 300) can access and is coupled to SSD2 (second SSD 315). Therefore, the network interconnect 301 is a communication path between the first physical machine 230 and second physical machine 330.

Figure 4:
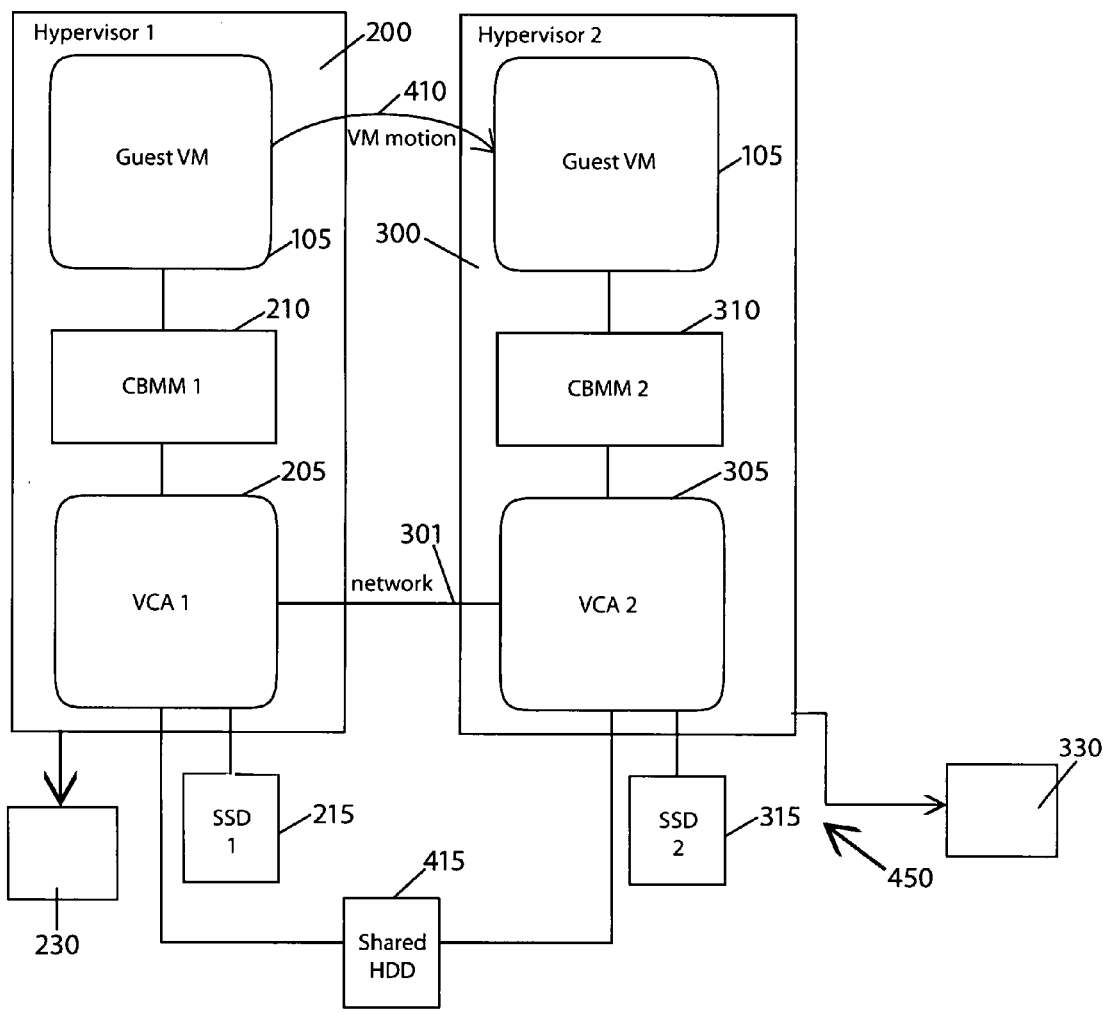
FIG. 4 is a block diagram of a system in accordance with another embodiment of the invention.

FIG. 4 is another simplified schematic of a system 450 that shows additional VCA and CBMM instances (VCA2 305 and CBMM2 310, respectively) on the second hypervisor 300 (Hypervisor 2). When the Guest VM 105 migrates from first hypervisor 200 (hypervisor 1) to second hypervisor 300 (hypervisor 2), the guest VM 105 simply reestablishes (or establishes) its IO paths through the second instance CBMM2 of the intermediate multipathing module 210 and the second instance VCA2 of the VCA 205. The instances CBMM2 and VCA2 are on the second hypervisor 300 (Hypervisor 2). As similarly discussed above, the first instance CBMM1 of the intermediate multipathing module 210 and first instance VCA1 of the VCA 205 is on the first hypervisor 200. The guest VM 105 migrates from the Hypervisor 1 to the Hypervisor 2 by use of a suitable migration method 410 such as, VM motion or another suitable virtual machine migration technique. Notice that the role of VCA1 205 now changes to serving cache data replication (exactly the role that VCA2 305 has in FIG. 3). The Hypervisor 1 runs on a first physical machine 230 (or first computer 230), while Hypervisor 2 runs on a second physical machine 330 (or second computer 330). The Hypervisor 1 and Hypervisor 2 can both read and write to a shared hard disk drive ((HDD) 415 that is coupled to and shared by the Hypervisor 1 and Hypervisor 2. Therefore, an embodiment of the invention provides an arrangement or apparatus comprising a virtual caching appliance VCA and a special purpose intermediate multipathing module CBMM that interfaces with VCA. Various caching data methods can also be used within the VCA.

In an embodiment, the VCA performs data caching of hard disks on SSDs. The Module CBMM intercepts virtual disk IO requests from virtual machine, propagates the IO requests to VCA, and propagates data returned from VCA back to virtual machine.

Another embodiment of the invention also provides a cluster configuration comprising hypervisor-based computer systems where an interconnected system of VCA and CBMM instances provides distributed SSD caching. Various suitable replicated data caching methods and/or suitable distributed data caching methods can also be used in this cluster configuration.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable medium or non-transient computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
a computer;
a hypervisor running on the computer;
wherein the hypervisor is running one or more virtual machines on the computer;
wherein the hypervisor comprises a virtual caching appliance (VCA) and an intermediate multipathing module that interfaces with the VCA;
wherein the VCA and the intermediate multipathing module are connected by a communication path;
wherein the intermediate multipathing module is configured to pass an I/O (input/output) request from a virtual machine to the VCA; and
wherein the VCA is configured to determine if the I/O request is to be passed from the VCA to a solid state storage that is coupled to the computer or if the I/O request is to be passed from the VCA to a hard disk storage that is coupled to the computer; wherein the intermediate multipathing module intercepts I/O requests from a virtual machine of the one or more virtual machines on the computer to a virtual disk, propagates the intercepted I/O requests to the VCA, and propagates data returned from the VCA in response to the intercepted I/O requests to the virtual machine of the one or more virtual machines on the computer that made the intercepted I/O requests.

2. The apparatus of claim 1,
wherein the VCA is configured to perform data caching of a hard disk storage on a solid state storage;
wherein the intermediate multipathing module is configured to intercept virtual disk IO (input/output) requests from the virtual machine and to propagate the 10 requests to the VCA; and
wherein the intermediate multipathing module is configured to propagate data returned from the VCA back to the virtual machine.

3. The apparatus of claim 1, wherein the VCA and the intermediate multipathing module are connected by a high speed communication path.

4. The apparatus of claim 1, wherein the hypervisor further comprises a hypervisor file system that detects and mounts a device made visible through the intermediate multipathing module during a start-up of the hypervisor.

5. The apparatus of claim 1, wherein the hypervisor comprises a hypervisor configuration which does not include a hypervisor file system in an input/output 10 path of a request from the virtual machine.

6. The apparatus of claim 1, wherein the VCA is configured to perform functions of data caching such as read-only, write-through, and write-back caching.

7. The apparatus of claim 1, further comprising a second hypervisor;
wherein the hypervisor and the second hypervisor form a cluster configuration;
wherein the cluster configuration comprises instances of the VCA and intermediate multipathing module that provide distributed solid state drive (SSD) caching.

8. The apparatus of claim 7, wherein the instances of the VCA are connected by a network connection.

9. The apparatus of claim 7, wherein the virtual machine migrates to the second hypervisor and establishes IO paths with an instance of the VCA and an instance of the intermediate multipathing module on the second hypervisor.

10. The apparatus of claim 7, wherein the hypervisor and the second hypervisor share a shared hard disk drive.

11. A method, comprising:
    running a hypervisor on a computer;
    wherein the hypervisor is running one or more virtual machines on the computer;
    wherein the hypervisor comprises a virtual caching appliance (VCA) and an intermediate multipathing module that interfaces with the VCA;
    wherein the VCA and the intermediate multipathing module are connected by a communication path;
    passing, by the intermediate multipathing module, an I/O (input/output) request from a virtual machine to the virtual caching appliance (VCA) in the hypervisor; and
    determining, by the VCA, if the I/O request is to be passed from the VCA to a solid state storage that is coupled to the computer or if the I/O request is to be passed from the VCA to a hard disk storage that is coupled to the computer wherein the intermediate multipathing module intercepts I/O requests from a virtual machine of the one or more virtual machines on the computer to a virtual disk, propagates the intercepted I/O requests to the VCA, and propagates data returned from the VCA in response to the intercepted I/O requests to the virtual machine of the one or more virtual machines on the computer that made the intercepted I/O requests.

12. The method of claim 11, further comprising:
    performing data caching of a hard disk storage on a solid state storage;
    intercepting virtual disk IO (input/output) requests from the virtual machine and propagating the IO requests to the VCA; and
    propagating data returned from the VCA back to the virtual machine.

13. The method of claim 11, wherein the VCA and an intermediate multipathing module are connected by a high speed communication path.

14. The method of claim 11, further comprising:
    performing functions of data caching such as read-only, write-through, and write-back caching.

15. The method of claim 11, further comprising:
    providing distributed caching in a cluster configuration comprising instances of the VCA and an intermediate multipathing module.

16. The method of claim 15, wherein the instances of the VCA are connected by a network connection.

17. The method of claim 15, further comprising:
    migrating the virtual machine to a second hypervisor and establishing IO paths with an instance of the VCA and an instance of the intermediate multipathing module on a second hypervisor.

18. The method of claim 17, wherein the hypervisor and the second hypervisor share a shared hard disk drive.

19. An article of manufacture, comprising:
    a non-transitory computer-readable medium having stored thereon instructions operable to permit an apparatus to:
    run a hypervisor on a computer;
    wherein the hypervisor is running one or more virtual machines on the computer;
    wherein the hypervisor comprises a virtual caching appliance (VCA) and an intermediate multipathing module that interfaces with the VCA;
    wherein the VCA and the intermediate multipathing module are connected by a communication path;
    pass, by the intermediate multipathing module, an I/O (input/output) request from a virtual machine to the virtual caching appliance (VCA) in the hypervisor; and
    determine, by the VCA, if the I/O request is to be passed from the VCA to a solid state storage that is coupled to the computer or if the I/O request is to be passed from the VCA to a hard disk storage that is coupled to the computer wherein the intermediate multipathing module intercepts I/O requests from a virtual machine of the one or more virtual machines on the computer to a virtual disk, propagates the intercepted I/O requests to the VCA, and propagates data returned from the VCA in response to the intercepted I/O requests to the virtual machine of the one or more virtual machines on the computer that made the intercepted I/O requests.

20. The article of manufacture of claim 19, wherein instructions are operable to permit the apparatus to:
    perform data caching of a hard disk storage on a solid state storage;
    intercept virtual disk IO (input/output) requests from the virtual machine and propagate the IO requests to the VCA; and
    propagate data returned from the VCA back to the virtual machine.

* * * * *